United States Patent [19]

Southam

[11] 4,022,305
[45] May 10, 1977

[54] PARKING ACTUATOR FOR A DUO-SERVO DRUM BRAKE

[75] Inventor: Terence George Southam, Walsall, England

[73] Assignee: Girling Limited, Birmingham, England

[22] Filed: July 15, 1975

[21] Appl. No.: 596,160

[30] Foreign Application Priority Data

July 19, 1974 United Kingdom ............ 32029/74

[52] U.S. Cl. ............................. 188/332; 188/325
[51] Int. Cl.² ........................................ F16D 51/22
[58] Field of Search .......... 188/325, 328, 329, 330, 188/331, 332

[56] References Cited

UNITED STATES PATENTS

| | | | |
|---|---|---|---|
| 2,173,582 | 9/1939 | Fisher | 188/332 |
| 3,245,501 | 4/1966 | Dudley | 188/332 |
| 3,850,266 | 11/1974 | Hesskamp et al. | 188/332 |
| 3,871,493 | 3/1975 | Mathias | 188/325 |

FOREIGN PATENTS OR APPLICATIONS

| | | | |
|---|---|---|---|
| 1,231,849 | 10/1960 | France | 188/329 |
| 54,997 | 6/1951 | France | 188/332 |

*Primary Examiner*—Trygve M. Blix
*Assistant Examiner*—Edward R. Kazenske
*Attorney, Agent, or Firm*—Scrivener Parker Scrivener & Clarke

[57] ABSTRACT

In an internal shoe-drum brake of the duo-servo type for vehicles adjacent shoe ends are separated by an angularly movable cam. The cam is moved angularly by a separate cam lever to which it is coupled, and the cam is permitted a circumferential movement both with the shoe ends and relative to the lever in the application of the brake.

5 Claims, 6 Drawing Figures

PARKING ACTUATOR FOR A DUO-SERVO DRUM BRAKE

This invention relates to internal shoe-drum brakes of the duo-servo type for vehicles, the brakes being of the kind in which opposed arcuate shoes are adapted to be separated to bring the shoes into engagement with a rotatable drum by an angularly movable cam located between adjacent shoe ends and permitted a limited movement with the actuated shoe ends in the application of the brake, and the ends of the shoes remote from the cam are articulated together or otherwise connected so that on application of the brake the leading shoe, known as the primary shoe, transmits a circumferentially directed force to the other secondary shoe and the drag on the shoes is taken by a first abutment which may comprise an anchor pin located between the actuated shoe ends and with which the secondary shoe engages.

In one form of duo-servo brake of the kind set forth the cam is angularly movable to apply the brake by a brake operating lever which acts on the cam through transmission means comprising or including a flexible cable coupled to a cam lever which may be integral with the cam or acts on the cam through a projection. In such a construction, when the brake is applied with the drum rotating in a normal forward direction, the actuated end of the secondary shoe is in engagement with the first abutment and the actuated end of the primary shoe is spaced from the anchor pin. Under such conditions should the drum rotate in the opposite direction, for example by the vehicle running back, the shoes are carried round with the drum in an opposite direction with the secondary shoe moving away from the first abutment. This can continue until the movement of the shoes is arrested by the primary shoe, which acts as the secondary shoe, engaging with a second abutment, conveniently also comprising the anchor pin. During this movement of the shoes the cam is moved circumferentially in the opposite direction to apply a tension through the cam lever to the cable and the tension may be of a magnitude sufficient to cause the cable to extend or to part. Also this circumferential movement of the cam induces higher loads in the cam, cam lever and other parts.

According to our invention in a brake of the kind set forth for vehicles the cam is angularly movable to apply the brake by a separate cam lever which is itself angularly movable about a pivot fixed with respect to the anchor pin, and the cam and the cam lever are coupled by a connection by means of which transmission means are also connected to the cam lever, the cam being permitted a circumferential movement both with the shoe ends and relative to the lever in the application of the brake.

This ensures that the effective tension in the transmission means does not increase in the event of the brake changing from the first abutment to the second abutment.

Conveniently the cam lever is also coupled to the cam by its pivot, and the cam is provided with spaced elongate slots through which the pivot and the connection extend.

This facilitates construction and installation as, in any case, the pivot and the connection are provided in any brake installation incorporating a cam angularly movable directly by transmission means.

The elongate slots are relatively inclined so that the cam describes a generally arcuate path with the shoe ends and, in a brake applied position, this ensures that no additional loads are applied to the transmission means through the cam lever.

When the abutments comprise a common anchor pin it is convenient for the pivot to comprise a pivot or extension of the anchor pin.

An internal shoe-drum brake and modification in accordance with our invention are illustrated in the accompanying drawings in which:-

Figure 1:
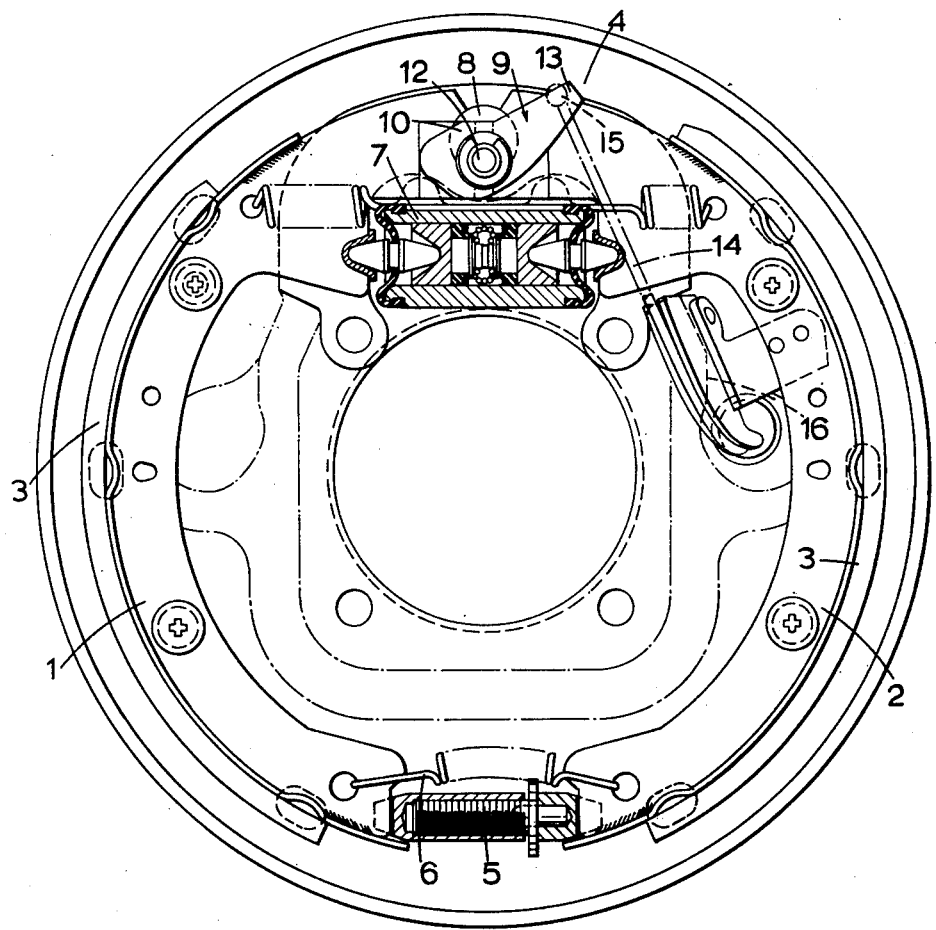
FIG. 1 is a plan of a known shoe-drum brake incorporating a mechanical actuator with the drum omitted for clarity.
Figure 2:
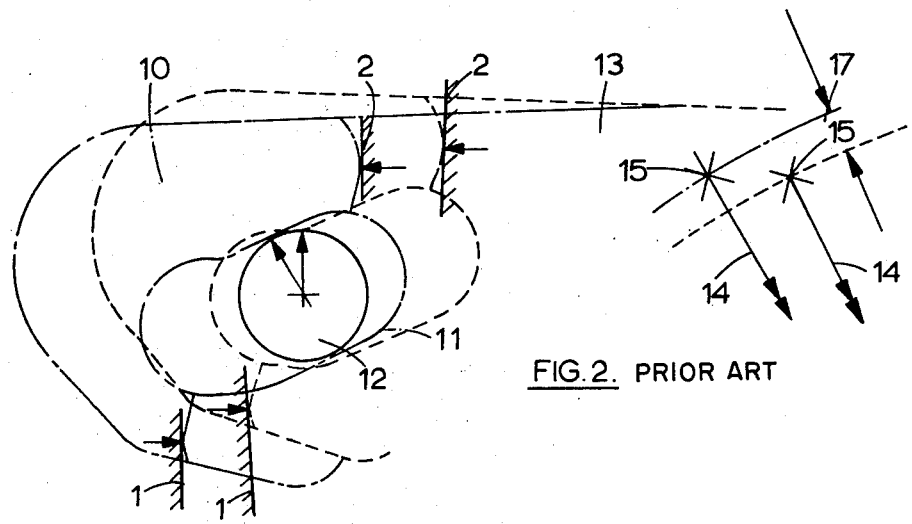
FIG. 2 is a diagram showing relative positions between different parts of the mechanical actuator under different operational conditions.

In the duo-servo brake illustrated in FIGS. 1 and 2 of the accompanying drawings, a pair of arcuate shoes 1, 2 carrying friction linings 3 for engagement with a rotatable drum (not shown) are mounted on a stationary back plate 4.

The shoes 1 and 2 are connected at one end by a floating-force transmitting member or strut 5 of adjustable length with which the shoe-ends are held in engagement by means of a tension spring 6.

At their opposite actuated ends, the shoes 1 and 2 are adapted to be separated for normal service braking by a double-ended hydraulic actuator 7. When the actuated ends are separated by the actuator 7, in the normal direction of drum rotation the shoes 1 and 2 are carried round with the drum until movement of the shoes is arrested by the engagement of the actuated end of the secondary shoe 2 with a drag-taking abutment comprising an anchor pin 8 which is located between the shoe ends and is upstanding from the back plate 4. Thereafter the braking applying force is transmitted by a self-energising action during which the primary shoe 1 applies a thrust to the secondary shoe 2 through the strut 5.

For parking or emergency braking the actuated shoe ends are adapted to be separated by a mechanical actuator 9 pivotally mounted on the anchor pin 8. The mechanical actuator 9 comprises a cam 10 provided with an elongate slot 11 which pivotally receives a pin 12 comprising a part of the anchor pin 8, and a cam lever 13.

The mechanical actuator 9 is adapted to be moved angularly through the cam lever 13 to apply the brake by means of a flexible inextensible cable 14 which is connected to the cam lever at 15 and is coupled to a hand brake lever, either directly or through transmission rods. In either case the cable 14 is angularly movable with a quadrant 16 pivotally mounted on the back plate 4 for routing the cable from the brake.

When the brake is applied by the mechanical actuator 9 with the drum rotating in a normal forward direction, the cam 10, the integral cam lever 13, and the ends of the shoes 1 and 2 move with respect to the pin 12 into the positions shown in chain dotted outline in FIG. 2 of the drawings with the shoe 2 engaging with a first abutment defined by the anchor pin 8. Should the vehicle then run back, for example down an incline, with the brake still applied by the mechanical actuator 9, the shoes 1 and 2 are carried round with the drum, taking the cam 10 and the cam lever 13 with them until the shoe 1, then acting as a secondary shoe, is arrested by a second abutment also defined by an opposite point on the anchor pin 8. The final positions relative to the pin 12 which are assumed by the shoes 1, 2, the cam 10, and the cam lever 13 are shown in dotted outline. It will be observed that the point 15 at which the cable 14 is connected to the cam lever 13 has moved both radially and circumferentially to apply to the parts of the actuator and the cable 14 and increased loading represented by a resultant movement in a radial direction of the point 15 through a distance 17. This increased loading is effective to extend the length of the cable 14 by an amount which may cause the cable to part or otherwise to damage or cause failure of the cam 10 or the cam lever 13. In this known construction the configuration of the slot 11 is chosen so that the distance 17 is reduced to a minimum.

According to our present invention, and as illustrated in FIGS. 3 to 6, the mechanical actuator 9 comprises an elongate cam 18 of generally kidney-shaped outline having a pair of relatively inclined elongate openings of slots 19, 20 and a pair of inwardly directed cam faces 21, 22 on opposite sides of the opening 19 for engagement with the shoe ends.

The cam 18 is mounted on the anchor pin 8 between the shoe ends with the anchor pin 8, which is of a diameter slightly less than the width of the opening 19, projecting through the opening 19.

A separate cam lever 23 of elongate outline is superimposed upon the cam 18 and is mounted on an extension 24 of the anchor pin 8 which is of reduced diameter. The lever 23 is angularly movable about a bush 25 which encloses part of the extension 24 and is clamped against a shoulder 26 at the step in diameter by means of a nut 27 which acts on the bush through a washer 28.

Figure 5:
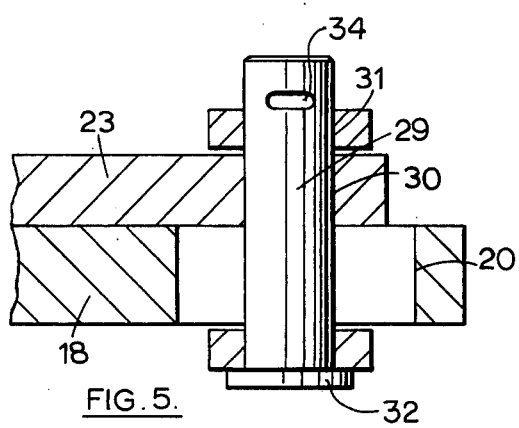
FIG. 5 is a section in the line 5—5 of FIG. 3.

The cam 18 and the lever 23 are also coupled adjacent to their opposite ends by a pivot pin 29 which extends through the elongate opening 20 and an opening 30 in the lever 23. The pin 29 also forms a pivotal connection with the flexible cable 14 through a clevis or bifurcated end fitting 31 straddling the cam 18 and the lever 23. As can be seen in FIG. 5 the pin 29 has abutments at its opposite ends, such as an enlarged head 32 and a retaining means 34 which cooperates with the clevis to prevent axial separation from the pivot pin 29 of the cam, cam lever and the clevis, the pin also serving as the sole connection between these members.

When the brake is applied by the mechanical actuator 9, angular movement of the lever 23 in a clockwise direction about the extension 24 as an axis is transmitted to the cam 18 through the pin 29 and the effect of the anchor pin 8 precludes radial movement of the cam 18. Thus the cam 18 is moved angularly to separate the shoe ends and as the shoes 1 and 2 go round with the drum, the cam 18 moves in a circumferential direction with respect to the lever 23 until movement of the shoes is arrested by the anchor pin 8 with which the secondary shoe 2 engages.

Figure 6:
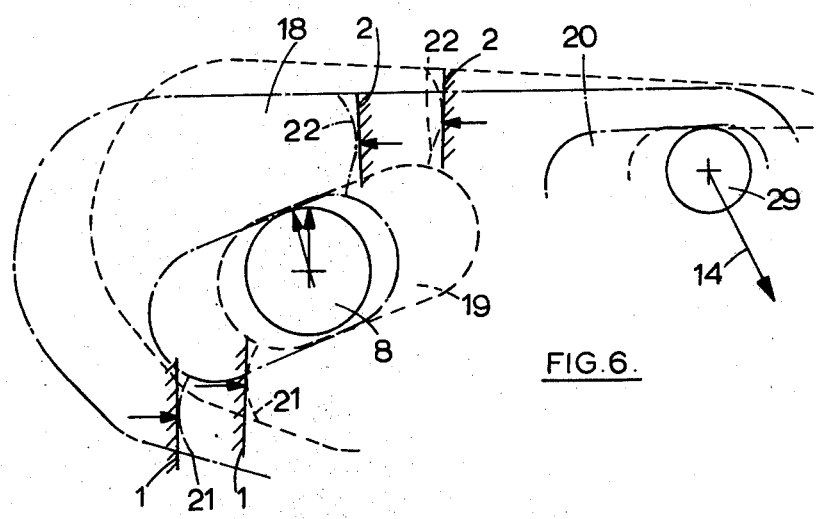
FIG. 6 is a diagram similar to FIG. 2 but showing the equivalent relative positions of the actuator illustrated in FIGS. 3 to 5.
Figure 3:
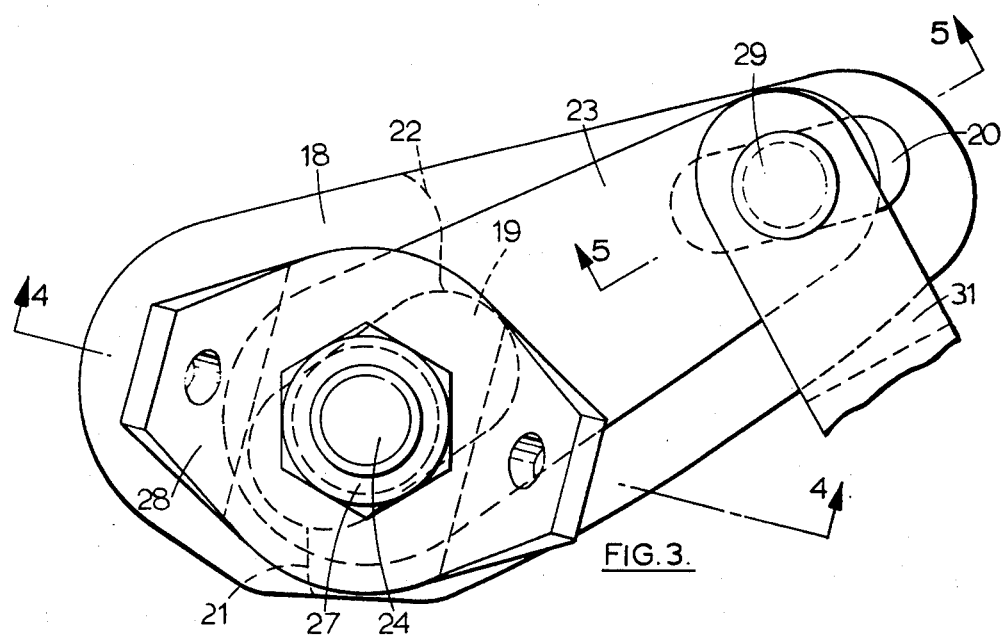
FIG. 3 is a plan view on an enlarged scale of a mechanical actuator suitable for incorporation in the brake of FIG. 1.
Figure 4:
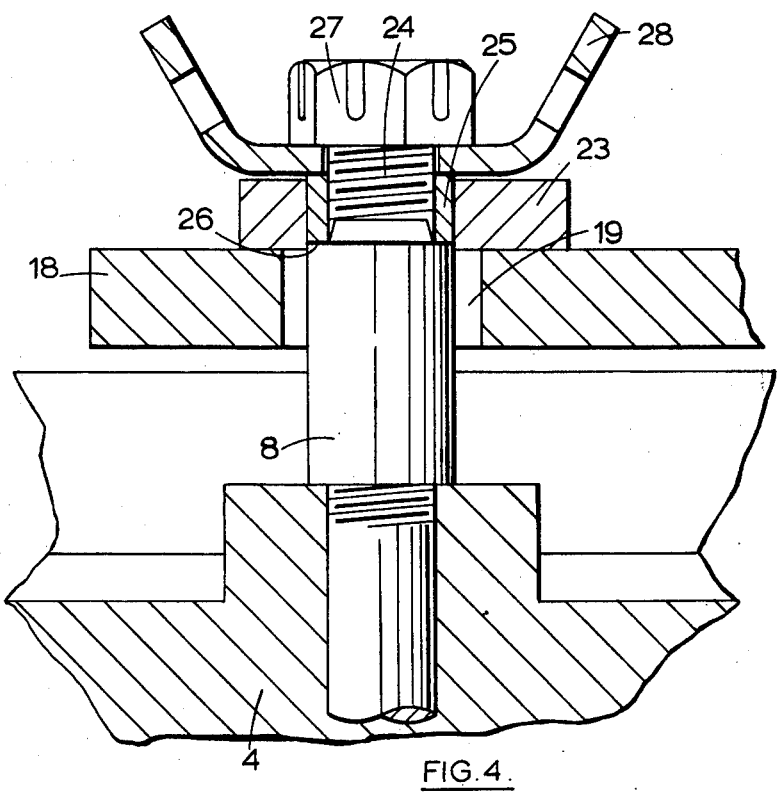
FIG. 4 is a section on the line 4—4 of FIG. 3.

The relative angles of inclination of the openings 19 and 20 are chosen so that the cam 18 describes a generally arcuate path when moving circumferentially with the shoe ends. Thus, in the event of the drum rotating in a reverse direction with the brake applied by the mechanical actuator 9, the cam 18 can move circumferentially with the shoe ends relative to and independently of the lever 23. This effect which is illustrated in FIG. 6 ensures that the brake applying load or tension in the cable is not increased under such conditions. As in FIG. 2, the relative positions assumed by the parts when the brake is applied by the actuator 9 with the drum rotating in a normal forward direction are shown in chain dotted outline, and the relative positions assumed when the drum rotates in the opposite direction with the brake applied are shown in dotted outline.

I claim:

1. A vehicle internal shoe-drum brake of the duo-servo type comprising opposed arcuate shoes for engagement with a rotatable drum and having adjacent actuated ends and adjacent non-actuated ends, an angularly movable cam located between said actuated ends of said shoes and movable angularly to separate said actuated ends to apply the brake, means coupling together said non-actuated ends so that when the brake is applied one of said shoes acting as a leading shoe and known as a primary shoe is carried round with the drum to transmit a circumferentially directed force to the other of said shoes known as a secondary shoe, an anchor pin located between said actuated shoe ends and defining a first abutment engaged by said actuated end of said secondary shoe to take the drag on said shoes, a cam lever separate from said cam, a non-rotatable pivot fixed against substantial lateral movement with respect to said anchor pin and about which said cam lever is angularly moveable, transmission means for moving said cam lever angularly about said pivot, a single pivot pin separate from said pivot and fixed against lateral movement relative to said cam lever, said pivot pin directly connecting together said cam, said cam lever and said transmission means and being the sole connection between these members, means cooperating with said pivot pin and said transmission means to prevent axial separation from each other and said pin of said cam, said cam lever and said transmission means, said pivot for said cam lever also coupling said cam lever and said cam, and guide means incorporated in said cam constructed and arranged to permit said cam to have a circumferential movement both with said actuated shoe ends and relative to said cam lever in the application of the brake, said guide means comprising a pair of spaced elongated slots in said cam through which said pivot and said pivot pin extend, respectively.

2. An internal shoe-drum brake as claimed in claim 1, wherein said elongate slots are relatively inclined so that said cam itself describes a generally arcuate path with said actuated shoe ends when the brake is applied and no additional tension is applied to said transmission means when said shoes move with the drum relative to said first abutment.

3. An internal shoe-drum brake as claimed in claim 1, wherein said first abutment and a second abutment for said actuated end of said primary shoe both comprise said anchor pin, and wherein said pivot for said cam lever which extends through one of said slots in said cam also comprises said anchor pin.

4. An internal shoe-drum brake as claimed in claim 3, wherein said anchor pin is provided with an extension defining said pivot for said cam lever.

5. An internal shoe-drum as claimed in claim 1, wherein the cam is of elongate outline and has a pair of inwardly directed cam faces for engagement with said actuated shoe ends, and said pivot which extends through one of said elongate slots in said cam comprises an anchor pin on which said cam is mounted and wherein the cam lever is superimposed upon said cam and is mounted on an extension of said anchor pin which is of reduced diameter, said cam lever having an opening, and said pivot pin extending through said opening in said lever, and a bifurcated fitting straddling both said cam and said cam lever and connected to a flexible cable defining said transmission means, and said pivot pin also forming a pivotal connection with said bifurcated fitting and being substantially complementary with said opening said means cooperating with said pin and said transmission means to prevent axial separation of the members from said pivot pin and each other comprising abutment means at opposite ends of said pin cooperating with said bifurcated fitting.

* * * * *